United States Patent [19]
Li et al.

[11] 3,947,527
[45] Mar. 30, 1976

[54] POLYMERIZATES OF OLEFINIC NITRILES AND DIENE RUBBERS

[75] Inventors: George S. Li, Aurora; Gerald P. Coffey, Cleveland Heights, both of Ohio

[73] Assignee: The Standard Oil Company, Cleveland, Ohio

[22] Filed: Feb. 21, 1975

[21] Appl. No.: 551,773

[52] U.S. Cl............................. 260/879; 260/880 R
[51] Int. Cl.² ........................................... C08L 9/02
[58] Field of Search....... 260/879, 880 R, 81, 80.72, 260/85.5 B, 85.5 HC, 85.5 F

[56] References Cited
UNITED STATES PATENTS

| | | | |
|---|---|---|---|
| 3,426,102 | 2/1969 | Solak | 260/879 |
| 3,586,737 | 6/1971 | Duke | 260/879 |
| 3,775,518 | 11/1973 | Endo | 260/880 R |
| 3,846,509 | 11/1974 | Saluti | 260/879 |

OTHER PUBLICATIONS

Nozaki, J. Polymer Science, Vol. 1, No. 6, 1946, pp. 455–460.

*Primary Examiner*—Paul R. Michl
*Attorney, Agent, or Firm*—John F. Jones; Sherman J. Kemmer

[57] ABSTRACT

Polymeric compositions having good impact resistance, low permeability to gases, and high-softening temperatures which are composed of a conjugated diene monomer, such as butadiene, an olefinically unsaturated nitrile, such as acrylonitrile, and indene are described.

10 Claims, No Drawings

POLYMERIZATES OF OLEFINIC NITRILES AND DIENE RUBBERS

The present invention relates to novel polymeric compositions which have good impact resistance, low permeability to gases, and high-softening temperatures, and more particularly pertains to high-softening, impact-resistant compositions of low-creep characteristics which function as gas and vapor barrier materials and are composed of the essential components of a conjugated diene monomer, an olefinically unsaturated nitrile, and indene, and to a process for preparing them.

The novel polymeric products of the present invention are prepared by polymerizing a major portion of an olefinically unsaturated nitrile, such as acrylonitrile, and a minor portion of indene in the presence of a preformed rubbery polymer composed of a conjugated diene monomer, such as butadiene. The present invention is an improvement over the invention disclosed in our co-pending U.S. Pat. application Ser. No. 525,376 filed Nov. 20, 1974.

The conjugated diene monomers useful in the present invention include butadiene-1,3, isoprene, chloroprene, bromoprene, cyanoprene, 2,3-dimethylbutadiene-1,3, and the like. Most preferred for the purpose of this invention are butadiene and isoprene because of their ready availability and their excellent copolymerization properties.

The olefinically unsaturated nitriles useful in this invention are the alpha,beta-olefinically unsaturated mononitriles having the structure

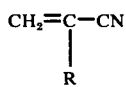

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitrile in the present invention is acrylonitrile.

Indene (1-H-indene) and coumarone (2,3-benzofuran) and mixtures are useful as monomers in the present invention. Most preferred is indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is emulsion polymerization. The polymerization is preferably carried out in an aqueous medium in the presence of an emulsifier and a free-radical generating polymerization initiator at a temperature of from about 0° to 100°C in the substantial absence of molecular oxygen.

The rubbery polymers in the present invention are homopolymers of the conjugated diene monomers mentioned above as well as copolymers of these dienes and another monomer component such as acrylonitrile, styrene, ethyl acrylate, and mixtures thereof, wherein there is present at least 50% by weight of the total monomers of the conjugated diene monomer.

The preferred polymeric compositions embodied herein are those resulting from the polymerization of 100 parts by weight of (A) about 50 to 90% by weight of at least one nitrile having the structure

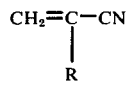

wherein R has the foregoing designation and (B) from 10 to 50% by weight of at least one member selected from the group consisting of indene and coumarone in the presence of from 1 to 40 parts by weight of (C) a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

The preferred process of this invention comprises polymerization in aqueous emulsion with free radical initiation at a temperature in the range of from 0° to 100°C 100 parts by weight of (A) about 50 to 90% by weight of at least one nitrile having the structure

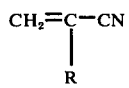

wherein R is hydrogen, a lower alkyl group having from 1 to 4 carbon atoms, or a halogen, and (B) from 10 to 50% by weight of at least one member selected from the group consisting of indene and coumarone in the presence of from 1 to 40 parts by weight of (C) a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate wherein all or part of (A) and part of (B) are present when the polymerization reaction is initiated and the remainder of (B) or (A) plus (B) is added continuously or incrementally during the course of the polymerization.

More specifically, the present invention can be illustrated in the polymerization of a mixture of acrylonitrile and indene in the presence of a preformed copolymer of butadiene-1,3 and acrylonitrile to produce a product having excellent impact strength, exceptionally good impermeability to gases and vapors, and improved ASTM heat-distortion temperature. More preferably, the acrylonitrileindene monomer component should contain 60 to 90% by weight of acrylonitrile and 10 to 40% by weight of indene. Generally acceptable impact resistance for most applications is 0.5 foot pounds per inch of notch or greater notched Izod impact.

The preferred rubbery copolymer of butadiene-1,3 and acrylonitrile preferably contains more than 50% by weight of combined butadiene based on the total weight of combined butadiene and acrylonitrile. More preferably, the rubbery copolymer of butadiene and acrylonitrile should contain from 50 to 90%, and most preferably 60 to 80%, by weight of polymerized butadiene.

In the foregoing polymerization, it is preferred that from about 1 to 40, and more preferably 1 to 20, parts of the rubbery diene polymer be employed for each 100 parts of combined acrylonitrile and indene. It has generally been found that as the relative amount of the rubbery diene polymer is increased in the final polymeric product, the impact strength increases and the gas and vapor barrier properties decrease somewhat. It is generally preferred to use just enough of the rubbery diene polymer to impart the desired impact strength to the polymeric product and to retain the optimum gas and vapor barrier properties in the polymeric product.

The novel polymeric products of the present invention are readily processed thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance, and their impact strength and low permeability to gases and vapors make them useful in the packaging industry, and they are particularly useful in the manufacture of bottles, film, and other types of containers for liquids and solids.

In the following illustrative examples, the amounts of ingredients are expressed in parts by weight unless otherwise indicated.

EXAMPLE 1

A. A resin was prepared from the following ingredients:

| Ingredient | Parts |
| --- | --- |
| water | 233 |
| Gafac RE-610* | 2 |
| acrylonitrile | 70 |
| indene | 30 |
| limonene dimercaptan | 0.6 |
| 70/30 butadiene/acrylonitrile rubber latex (solids basis) | 15 |
| potassium persulfate | 0.28 |

*A mixture of R—O—(CH$_2$CH$_2$O—)$_n$PO$_3$M$_2$ and [R—O—(CH$_2$CH$_2$O—)$_n$]$_2$PO$_2$M wherein n is a number of from 1 to 40, R is an alkyl or alkaryl group and preferably a nonyl phenyl group, and M is hydrogen, ammonia or an alkali metal, which composition is sold by GAF Corporation.

1. First Stage — An emulsion of 70 parts of acrylonitrile, 17.5 parts of indene, 15 parts (solids basis) of the rubber latex, and 0.1 part of limonene dimercaptan in 225 parts of water with 2 parts of Gafac RE-160 was heated in the substantial absence of molecular oxygen to 60°C with stirring. The polymerization was then initiated by the addition of 0.1 part of potassium persulfate and the polymerization was allowed to proceed under these conditions for about 6 hours.

2. Second Stage — The mixture obtained in the first stage was heated to 70°C, and a mixture of 0.2 part of potassium persulfate in 8 parts of water was added in six increments over a period of 5 hours while the remaining 12.5 parts of indene and 0.5 part of limonene dimercaptan were slowly added over the same time period. The resulting latex was coagulated and dried. The resin was obtained in 88% yield and was found to have the following properties:

| | |
| --- | --- |
| ASTM heat-distortion temperature (264 psi) | 101°C |
| notched Izod impact strength | 1.20 foot pounds per inch of notch |
| Brabender torque at 230°C | 2400 meter grams |

B. The same ingredients and amounts were used as described in (A) of this example. The ingredients, except for the potassium persulfate, were batch charged and brought to 60°C with stirring in the substantial absence of molecular oxygen, at which time the potassium persulfate was added and the polymerization was allowed to proceed under these conditions for 16 hours. The resulting latex was coagulated and the resin was dried to give a 66% yield. The resin was found to have the following properties:

| | |
| --- | --- |
| ASTM heat-distortion temperature (264 psi) | 108°C |
| notched Izod impact strength | 0.11 foot pounds per inch of notch |
| Brabender torque at 230°C | 800–900 meter grams |

EXAMPLE 2

A resin was prepared from the following ingredients:

| Ingredient | Parts |
| --- | --- |
| water | 262 |
| Gafac RE-610 | 2.25 |
| acrylonitrile | 70 |
| indene | 30 |
| limonene dimercaptan | 0.75 |
| 70/30 butadiene/acrylonitrile rubber latex (solids basis) | 15 |
| azobisisobutyronitrile | 0.45 |

An emulsion of 70 parts of acrylonitrile, 5 parts of indene, 15 parts of rubber, and 0.25 part of limonene dimercaptan in 262 parts of water and 2.25 parts of Gafac RE–610 was heated with stirring under a nitrogen atmosphere to 70°C. The polymerization was then initiated with 0.1 part of azobisisobutyronitrile. The remainder of the indene (25 parts) and limonene dimercaptan (0.5 part) was added continuously over a 9-hour polymerization period, and during this time additional azobisisobutyronitrile (0.35 part) was added in seven increments. Overall polymerization conditions were 9 hours at 70°C. The latex was then coagulated and the dried resin was found to have the following properties:

| | |
| --- | --- |
| ASTM heat-distortion temperature (264 psi) | 84°C |
| notched Izod impact resistance | 1.7 foot pounds per inch of notch |
| Brabender torque | 2200 meter grams |

EXAMPLE 3

A resin was prepared from the following ingredients:

| Ingredient | Parts |
| --- | --- |
| water | 232 |
| Gafac RE-610 | 3 |
| acrylonitrile | 70 |
| indene | 30 |

| Ingredient | Parts |
| --- | --- |
| limonene dimercaptan | 0.75 |
| 70/30 butadiene/acrylonitrile rubber latex (solids) | 15 |
| azobisisobutyronitrile | 0.2 |
| potassium persulfate | 0.175 |

An emulsion of 70 parts of acrylonitrile, 6.51 parts of indene, 15 parts of rubber, and 0.25 part of limonene dimercaptan in 232 parts of water and 2 parts of Gafac RE–610 was heated to 65°C with stirring under nitrogen and was then initiated by the addition to the polymerization mixture of 0.1 part of azobisisobutyronitrile. A solution of 23.49 parts of indene and 0.5 part of limonene dimercaptan was added to the polymerization mixture over an 8-hour period. The reaction mixture was also treated during this period with 0.1 part of azobisisobutyronitrile at the one-hour point and 0.175 part of potassium persulfate in 7 uniform parts between the 2.5-hour and 6-hour points after the initial reaction started. The resulting latex was coagulated and the resin was dried and found to have the following properties:

| | |
| --- | --- |
| ASTM heat-distortion temperature (264 psi) | 98°C |
| notched Izod impact resistance | 1.25 foot pounds per inch of notch |
| Brabender torque | 3100 meters grams |

EXAMPLE 4

A resin was prepared from the following ingredients:

| Ingredient | Parts |
| --- | --- |
| water | 233 |
| Gafac RE-610 | 2 |
| acrylonitrile | 70 |
| indene | 30 |
| limonene dimercaptan | 0.6 |
| 65/35 butadiene/acrylonitrile rubber latex (solids basis) | 15 |
| potassium persulfate | 0.3 |

1. First Stage — An emulsion of 70 parts acrylonitrile, 17.5 parts of indene, 15 parts of rubber in latex form, 0.15 part of limonene dimercaptan, and 2 parts of Gafac RE–610 was heated with stirring under nitrogen to 60°C. The reaction was then initiated by adding 0.1 part of potassium persulfate and the polymerization was continued for 6 hours under these conditions.

2. Second Stage — The reaction mixture from the first stage was brought to 70°C and to it was added a solution of 0.2 part of potassium persulfate in 8 parts of water in six increments over 6 hours, and the remaining indene and limonene dimercaptan were added in two increments (8 parts of indene plus 0.25 part of limonene dimercaptan at 1.4 hours, 4.5 parts of indene plus 0.2 part of limonene dimercaptan at 4 hours). The polymerization reaction was continued for 6 hours at 70°C. The resulting latex was coagulated with hot aqueous $Al_2(SO_4)_3 \cdot 18H_2O$ and the resin was washed with boiling water. The dried resin (80% yield) was found to have the following properties:

| | |
| --- | --- |
| ASTM heat-distortion temperature (264 psi) | 97°C |
| notched Izod impact resistance | 1.04 foot pounds per inch of notch |
| Brabender torque | 2500 meter grams |

EXAMPLE 5

A resin was prepared from the following ingredients:

| Ingredient | Parts |
| --- | --- |
| water | 265 |
| Gafac RE-610 | 2.25 |
| acrylonitrile | 70 |
| indene | 30 |
| limonene dimercaptan | 0.5 |
| 70/30 butadiene/acrylonitrile rubber (solids) | 15 |
| ammonium persulfate | 0.3 |

1. First Stage — An emulsion of 40 parts of acrylonitrile, 10 parts of indene, 15 parts of rubber in latex form, 0.05 part of limonene dimercaptan, 186.5 parts of water, and 2.25 parts of Gafac RE–610 was heated with stirring under nitrogen to 60°C. At this point, 0.05 part of ammonium persulfate was added and the polymerization reaction was allowed to proceed for 6 hours under these conditions.

2. Second Stage — The mixture obtained in the first stage was diluted with 78.5 parts of water and heated to 70°C. A mixture of 30 parts of acrylonitrile, 20 parts of indene, and 0.45 part of limonene dimercaptan was added over a 5-hour period and during the same period, 0.25 part of ammonium persulfate was added in five increments. The polymerization of this stage was carried out for a total of 6 hours at 70°C. The latex was coagulated with hot aqueous alum and was washed thoroughly with hot water. The dried resin was formed to have the following properties:

| | |
| --- | --- |
| ASTM heat-distortion temperature (264 psi) | 101°C |
| notched Izod impact strength | 0.83 foot pounds per inch of notch |
| Brabender torque | 2800 meter grams |

EXAMPLE 6

When the procedure of Example 1(A) was repeated using 75 parts of acrylonitrile and 25 parts of indene, similar results were obtained.

EXAMPLE 7

When the procedure of Example 1(A) was repeated using 65 parts of acrylonitrile and 35 parts of indene, similar results were obtained.

EXAMPLE 8

When the procedure of Example 1(A) was repeated using 80 parts of acrylonitrile and 20 parts of indene, similar results were obtained.

EXAMPLE 9

When the procedure of Example 1(A) was repeated using 10 parts of butadiene-acrylonitrile rubber (solids basis), similar results were obtained although the Izod impact resistance was down slightly.

EXAMPLE 10

When the procedure of Example 1(A) was repeated using 20 parts of the butadiene-acrylonitrile rubber (solids basis), similar results were obtained although the Izod impact resistance was higher.

We claim:

1. The polymeric composition resulting from the copolymerization of 100 parts by weight of
   A. about 50 to 90% by weight of at least one nitrile having the structure

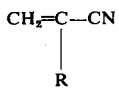

wherein R is hydrogen, a lower alkyl group having from 1 to 4 carbon atoms or a halogen, and
   B. from 10 to 50% by weight of at least one member selected from the group consisting of indene and coumarone in the presence of from 1 to 40 parts by weight of
   C. a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

2. The composition of claim 1 wherein (A) is acrylonitrile.

3. The composition of claim 2 wherein (B) is indene.

4. The composition of claim 3 wherein (C) is a butadiene-acrylonitrile copolymer.

5. The composition of claim 4 wherein there are 60 to 90% by weight of (A) and 10 to 40% by weight of (B) employed in the copolymerization.

6. The process comprising polymerization in aqueous emulsion with free radical initiation at a temperature in the range of from 0° to 100°C 100 parts by weight of
   A. about 50 to 90% by weight of at least one nitrile having the structure

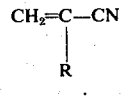

wherein R is hydrogen, a lower alkyl group having from 1 to 4 carbon atoms or a halogen, and
   B. from 10 to 50% by weight of at least one member selected from the group consisting of indene and coumarone in the presence of from 1 to 40 parts by weight of
   C. a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate wherein all or part of (A) and part of (B) are present when the polymerization reaction is initiated and the remainder of (B) or (A) plus (B) is added continuously or incrementally during the course of the polymerization.

7. The process of claim 6 wherein (A) is acrylonitrile.

8. The process of claim 7 wherein (B) is indene.

9. The process of claim 8 wherein (C) is a butadiene-acrylonitrile copolymer.

10. The process of claim 9 wherein there are 60 to 90% by weight of (A) and 10 to 40% by weight of (B) employed in the polymerization.

* * * * *